US006965830B1

(12) United States Patent
Bahorich

(10) Patent No.: US 6,965,830 B1
(45) Date of Patent: *Nov. 15, 2005

(54) SYSTEM FOR ESTIMATING THICKNESS OF THIN SUBSURFACE STRATA

(75) Inventor: Michael Stephen Bahorich, Houston, TX (US)

(73) Assignee: Apache Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/952,854

(22) Filed: Sep. 12, 2001

Related U.S. Application Data

(60) Provisional application No. 60/232,461, filed on Sep. 13, 2000.

(51) Int. Cl.$^7$ .......................... G06F 19/00; G06G 7/48
(52) U.S. Cl. ............................................. 702/14; 703/5
(58) Field of Search ................... 702/16, 14; 367/38; 703/5

(56) References Cited

U.S. PATENT DOCUMENTS

| | | | |
|---|---|---|---|
| 4,633,447 A | | 12/1986 | Bodine |
| 4,646,239 A | * | 2/1987 | Bodine et al. ................ 702/16 |
| 5,870,691 A | * | 2/1999 | Partyka et al. ................ 702/16 |
| 6,131,071 A | * | 10/2000 | Partyka et al. ................ 702/16 |

OTHER PUBLICATIONS

"Numerical Recipes in C", Press et al., 1992, Cambridge University Press, Cambridge England, Second Edition, pp. 568-569 and 575.*
Marfurt et al., Narrow-Band Spectral Analysis and Thin-Bed Tuning, Jul.-Aug. 2001, Geophysics, vol. 66, No. 4, pp. 1274-1283.*

Cox et al., Maximum Entropy Analysis of Dispersed Seismic Signals, Dec. 1986, Geophysics, vol. 51, No. 12, pp. 2225-2234.*
Marple, Jr., Frequency Resolution of Fourier and Maximum Entropy Spectral Estimates, Sep. 1982, Geophysics, vol. 47, No. 9, pp. 1303-1307.*
Partyka et al., Interpretational Applications of Spectral Decomposition in Reservoir Characterization, The Leading Edge, Mar. 1999.*
R.S. Kallweit and L.C. Wood; The limits of resolution of zero-phase wavelets; Geophysics; Jul. 1982; p. 1035-1046; vol. 47; No. 7.
John A. Lopez, Greg Partyka, Norm L. Haskell, and Susan E. Nissen; Identification of Deltaic Facies with 3-D Seismic Coherency and the Spectral Decomposition Cube: A Study From South Marsh Island Area, Gulf of Mexico; Houston Geological Society; Jan. 1998; p. 14-15; vol. 40; No. 5.
James Gridley and Greg Partyka; Processing and interpretational aspects of spectral decomposition: Annual Meeting Abstracts; Society of Exploration Geophysicists; 1997; p. 1055-1058.

(Continued)

*Primary Examiner*—Michael Nghiem
*Assistant Examiner*—Toan M. Le

(57) ABSTRACT

A system is disclosed for processing a group of spatially related seismic data traces in which seismic data windows extending over selected portions of said group of spatially related seismic data traces are defined, and a transform is applied to the successively selected windows to convert the seismic data within the successively selected widows to the frequency domain thereby generating a frequency spectrum of the seismic data within said successively selected windows. Selected frequency spectra are then combined to generate an average of the selected frequency spectra, thereby generating averaged frequency spectra, ane the averaged frequency spectra are utilized to generate data related to the location of thin beds in the earth's subsurface.

26 Claims, 12 Drawing Sheets

OTHER PUBLICATIONS

William H. Press, Saul A. Teukolsky, William T. Vetterling, and Brian P. Flannery; Numerical Recipes in C: Second Edition; 1992; p.568-569; Cambridge University Press; Cambridge England.

William H. Press, Saul A. Teukolsky, William T. Vetterling, and Brian P. Flannery; Numerical Recipes in C: Second Edition; 1992; p. 575; Cambridge University Press; Cambridge England.

M.B. Widess; How Thin Is A Thin Bed?; Geophysics; Dec. 1973; p. 1176-1180; vol. 38; No. 6.

James D. Robertson and Henry H. Nogami;Stratigraphic Modeling and Interpretation-Geophysical Principles and Techniques; Thin Bed Stratigraphy from Complex Trace Attributes: AAPG Bulletin; May 1982; p. 624; vol. 66; No. 5.

Norman S. Neidell and Elio Poggiagliomi; Seismic Stratigraphy Applications To Hydrocarbon Exploration; AAPG Memoir 26; 1977; p. 389-416.

James D. Robertson and Henry H. Nogami; Complex seosmic trace analysis of thin beds; Geophysics; Apr. 1989; p. 344-352; vol. 49; No. 4.

Andrew Marangakis, John K. Costain and Cahit Coruh; Use of integrated energy spectra for thin-layer recognition; Geophysics; Mar. 1985; p. 495-500; vol. 50, No. 3.

Ozdogan Yilmaz; Seismic Data Processing; Society of Exploration Geophysicists; 1987; Chapters 2.2 and 2.2.1; p.85-94; Tulsa, Oklahoma.

* cited by examiner

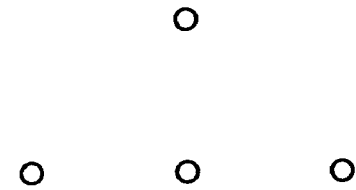
Fig. 3A                Fig. 3B
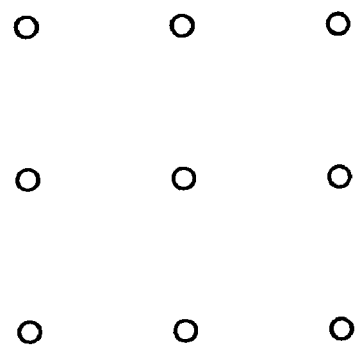
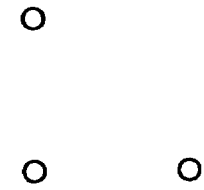
Fig. 3C                Fig. 3D

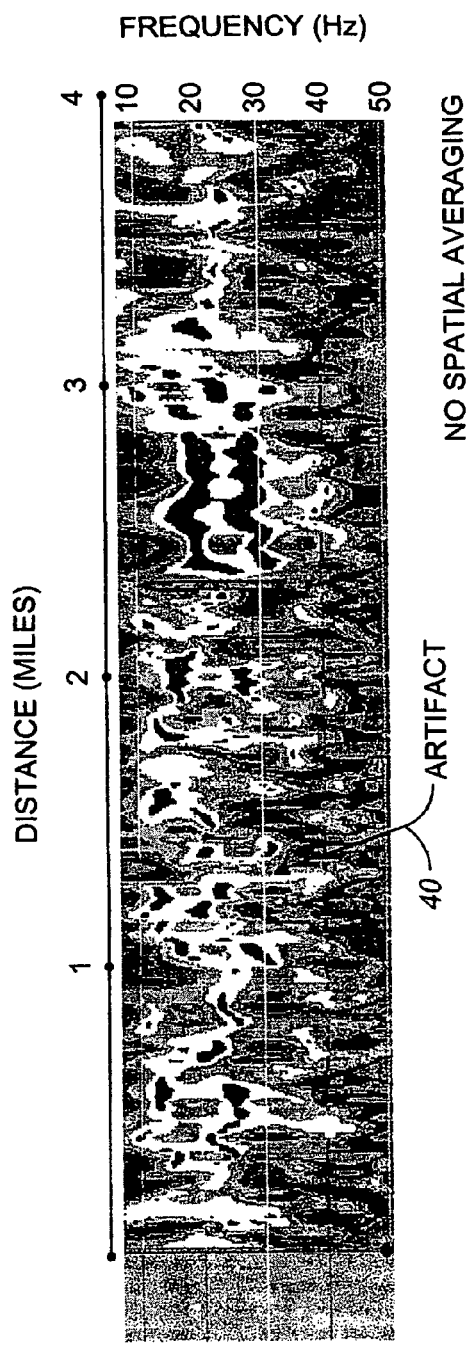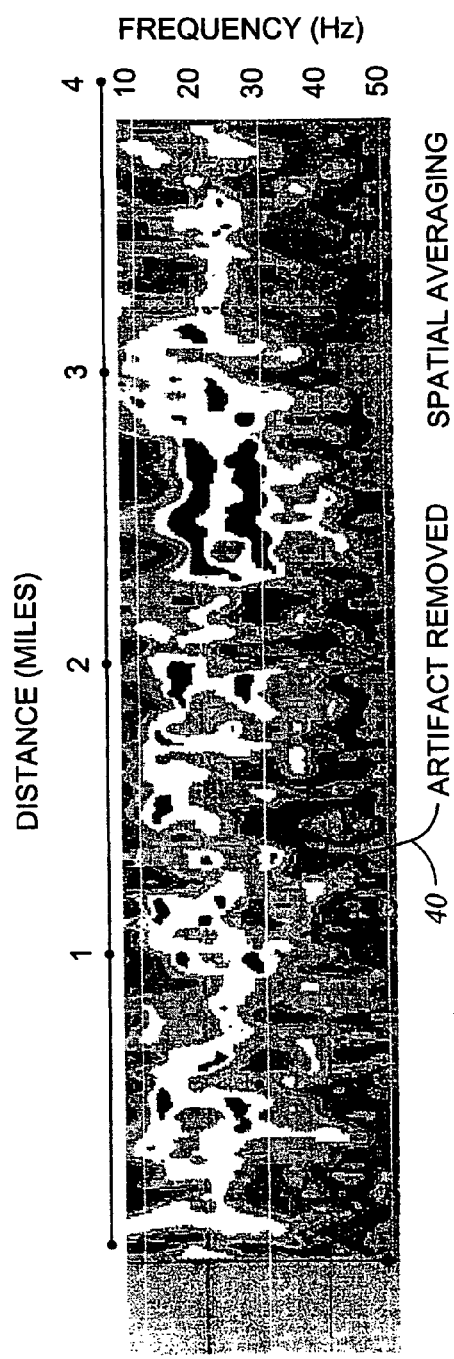
Fig. 7A
Fig. 7B

SYSTEM FOR ESTIMATING THICKNESS OF THIN SUBSURFACE STRATA

CROSS REFERENCE TO RELATED APPLICATIONS

This patent application is a Utility application of pending Provisional Patent Application 60/232,461, titled "System for Estimating Thickness of Thin Subsurface Strata", having a filing date of Sep. 13, 2000.

The subject matter of this patent application is related to U.S. patent application Ser. No. 09/498,012, titled "A System for Estimating Thickness of Thin Subsurface Strata", having a filing date of Feb. 4, 2000.

BACKGROUND OF THE INVENTION

1. Field of the Invention

This invention is related to seismic data processing. More specifically, the invention is related to a system for processing seismic data to more clearly delineate thin beds in the earth's subsurface.

2. Description of Related Art

A seismic survey is an attempt to map the subsurface of the earth by sending sound energy down into the ground and recording the reflected energy that returns from reflecting interfaces between rock layers below. On land, the source of the down-going sound energy is typically seismic vibrators or explosives. In marine environments the source is typically air guns. During a seismic survey, the energy source is moved across the earth's surface and a seismic energy signal is generated at successive locations. Each time a seismic energy signal is generated, the reflected energy is recorded at a large number of locations on the surface of the earth. In a two dimensional (2-D) seismic survey, the recording locations are generally laid out along a straight line, whereas in three-dimensional (3-D) surveys, the recording locations are distributed across the earth's surface in a grid pattern.

The seismic energy recorded at each recording location is typically referred to as a "trace". The seismic energy recorded at a plurality of closely located recording locations will normally be combined to form a "stacked trace" and the term "traces" as used herein is intended to include stacked traces. Each trace comprises a recording of digital samples of the sound energy reflected back to the earth's surface from discontinuities in the subsurface where there is a change in acoustic impedance of the subsurface materials. The digital samples are typically acquired at time intervals between 0.001 seconds (1 millisecond) and 0.004 seconds (four milliseconds). The amount of seismic energy that is reflected from an interface depends on the acoustic impedance contrast between the rock stratum above the interface and the rock stratum below the interface. Acoustic impedance is the product of density, p, and velocity, v. The reflection coefficient, which is the ratio of amplitude of the reflected wave compared to the amplitude of the incident may be written:

$$\text{reflection coefficient} = (\rho_2 v_2 - \rho_1 v_1)/(\rho_2 v_2 + \rho_1 v_1) \quad (\text{Eq. 1})$$

where, $\rho_2$=density of the lower layer
$\rho_1$=density of the upper layer
$v_1$=acoustic velocity of the lower layer, and
$v_2$=acoustic velocity of the upper layer.

Reflected energy that is recorded at the surface can be represented conceptually as the convolution of the seismic wavelet which is transmitted into the earth from a seismic source with a subsurface reflectivity function. This convolutional model attempts to explain the seismic signal recorded at the surface as the mathematical convolution of the downgoing source wavelet with a reflectivity function that represents the reflection coefficients at the interfaces between different rock layers in the subsurface. In terms of equations:

$$x(t)=w(t)*e(t)+n(t) \quad (\text{Eq. 2})$$

where, $x(t)$ is the recorded seismogram
$w(t)$ is the seismic source wavelet
$e(t)$ is the earth's reflectivity function
$n(t)$ is random ambient noise, and
* represents mathematical convolution.

Seismic data that have been properly acquired and processed can provide a wealth of information to the explorationist. However, the resolution of seismic data is not fine enough to depict "thin" beds with clarity. Seismic resolution may be defined as the minimum separation between two seismic reflecting interfaces that can be recognized as separate interfaces on a seismic record. Where a stratum (or layer) in the earth's subsurface is not sufficiently thick, the returning reflection from the top and the bottom of the layer overlap, thereby blurring the image of the subsurface. However, even though there may be only a single composite reflection and the thickness of the layer cannot be directly observed, there is still information to be found within the recorded seismic data that may be used indirectly to estimate the actual thickness of the lithologic unit.

FIG. 1 shows a "pinch out" seismic model in which a wedge-shaped sand stratum within a shale zone gradually diminishes in thickness until it disappears at the left side of FIG. 1. FIG. 2 is a set of mathematically generated synthetic seismic traces that illustrate the convolution of a seismic wavelet with the upper and lower interfaces of this wedge shaped stratum. At the right side of FIG. 2, the seismic reflections from the upper boundary and the lower boundary of the wedge-shaped stratum are spatially separated enough so that the reflections do not overlap and the two interfaces are distinctly shown on the seismic trace. Moving to the left within FIGS. 1 and 2, the individual reflections from the upper and lower surfaces of the wedge-shaped stratum begin to merge into a single composite reflection and eventually disappear as the thickness of the wedge goes to zero. However, the composite reflection still continues to change in character after the reflections from the upper and lower surfaces merge into a single composite reflection.

It has been disclosed in Widess, How thin is a thin bed?, Geophysics, December, 1973, vol. 38, p. 1176–1180, to use calibration curves which rely on the peak-to-trough amplitude of a composite reflected thin bed event, together with the peak-to-trough time separation, to provide an estimate of the approximate thickness of the thin layer. However, a necessary step in the calibration process is to establish a "tuning" amplitude for the thin bed event in question, which occurs at the layer thickness at which maximum constructive interference occurs between the reflections from the top and base of the unit. The success of this method is limited because of the need for careful seismic processing in order to establish the correct wavelet phase and to control the relative trace-to-trace seismic trace amplitudes.

Other methods for analyzing seismic data for the presence of thin beds involve converting the data to the frequency domain and analyzing the frequency domain data. For example, a method is disclosed in U.S. Pat. No. 5,870,691 which utilizes the discrete Fourier Transform to image and map the extent of thin beds and other lateral rock discontinuities in conventional 2-D and 3-D seismic data. The method is based on the observation that the reflection from a thin bed has a characteristic expression in the frequency domain that is indicative of the thickness of the bed. A homogeneous thin bed introduces a periodic sequence of notches into the amplitude spectrum of the composite reflection, which are spaced a distance apart that is inversely proportional to the temporal thickness of the thin bed. Accordingly, the thickness of the thin beds is determined by distance by which these notches are spaced apart.

A need continues to exist, however, for an improved method for extracting thin bed information from conventionally acquired seismic data. Frequently, a thin bed is a sand bed running through shale. Knowledge of the presence of sand beds and the bed thickness is very useful information because sand is a potential hydrocarbon reservoir.

It should be noted that the description of the invention which follows should not be construed as limiting the invention to the examples and preferred embodiments shown and described. Those skilled in the art to which this invention pertains will be able to devise variations of this invention within the scope of the appended claims.

SUMMARY OF THE INVENTION

A system is disclosed for processing a group of spatially related seismic data traces in which seismic data windows extending over selected portions of said group of spatially related seismic data traces are defined, and a transform is applied to the successively selected windows to convert the seismic data within the successively selected widows to the frequency domain thereby generating a frequency spectrum of the seismic data within said successively selected windows. Selected frequency spectra are then combined to generate an average of the selected frequency spectra, thereby generating averaged frequency spectra, and the averaged frequency spectra are utilized to generate data related to the location of thin beds in the earth's subsurface.

BRIEF DESCRIPTION OF THE DRAWINGS

FIGS. 3A, 3B, 3C and 3D show various configurations for combining seismic traces in accordance with the invention.

FIGS. 7A and 7B illustrate the results of use of the invention.

While the invention will be described in connection with its preferred embodiments, it will be understood that the invention is not limited thereto, but shall include all alternatives, modifications, and equivalents within the scope of the appended claims.

DESCRIPTION OF PREFERRED EMBODIMENTS

The invention comprises a system for processing seismic data to detect the presence of thin beds. The data may be either two-dimensional (2-D) data gathered at a succession of data points along a line on the earth's surface, or the data may be three-dimensional (3-D) data gathered from seismic data points distributed, typically in a grid pattern, within an area of the earth's surface. A seismic signal that is transmitted into the earth for purposes of conducting a seismic survey will typically include substantial energy within a frequency range extending from as low as 5 Hz. up to at least 60 Hz. When this energy reaches a thin bed in the earth's subsurface, a portion of the incident energy will be reflected from the upper interface of the thin bed and from the lower interface of the bed. If the bed were thicker, the reflection from the upper interface and from the lower interface would appear separately in the resulting seismic data and it would be possible to determine the bed thickness with standard seismic data interpretation methods. For a thin bed, however, the signal reflections from the upper and lower interfaces will overlap.

Figure 1:
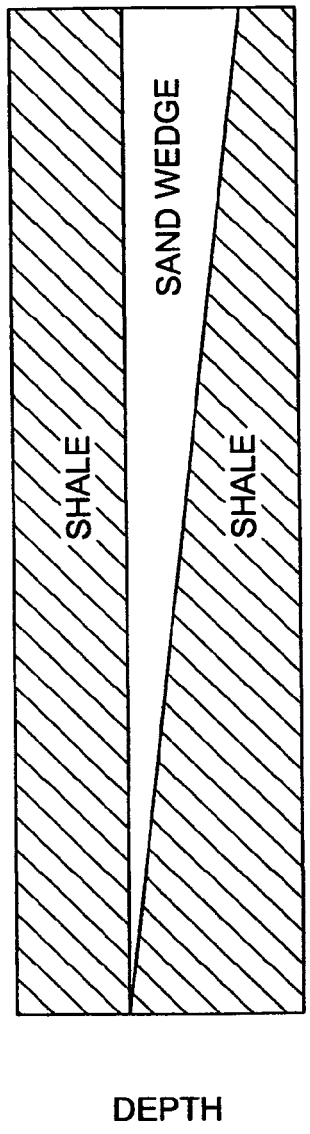
FIG. 1 shows a "pinch out" seismic model in which a wedge-shaped stratum gradually diminishes in thickness.
Figure 2:
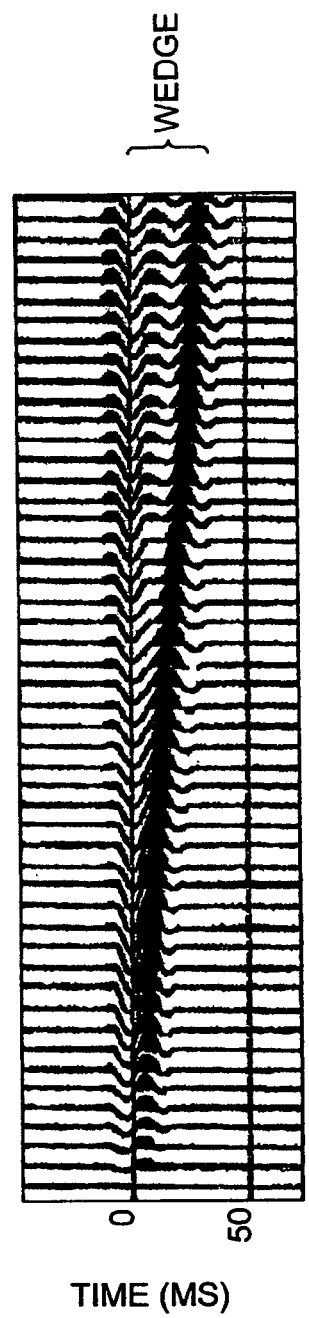
FIG. 2 shows a set of mathematically generated synthetic seismic traces that illustrate the convolution of a seismic wavelet with the upper and lower interfaces of the wedge-shaped model of FIG. 1.

Depending on the frequency of the incident seismic energy and the travel time of the seismic energy from the upper to the lower interface of a thin bed, and the acoustic velocities of the stratum above the thin bed and the stratum below the thin bed in relation to the acoustic velocity of the thin bed, the apparent amplitude of the reflected seismic energy will be enhanced or attenuated. The invention may be utilized for the analysis of seismic data to detect the presence of thin beds of sand between upper and lower strata of shale, such as illustrated in FIGS. 1 and 2. The acoustic velocity of the sand stratum may be greater than or less than the acoustic velocity of the shale, depending on the region of the earth from which the data are gathered, but the acoustic velocity of both the upper and lower shale strata can be expected to be either greater than or less than the velocity of the sand stratum, so that maximum enhancement of the reflected seismic energy will occur when the distance between the upper and lower interfaces of the sand stratum is equal to a quarter wavelength of the dominant frequency of the incident seismic energy. The invention may also be utilized to detect thin beds of shale between sand layers, or thin beds of sand, shale, carbonates or other subsurface strata which may be sandwiched between strata of similar matter or between strata of dissimilar matter. In general, when the acoustic velocity within the thin bed is greater than the acoustic velocity in the stratum above and the stratum below the thin bed, or when the velocity in the thin bed is less than the acoustic velocity in the strata above and below the thin bed, maximum enhancement of the reflected seismic energy will occur when the time distance between the upper interface and the lower interface of the thin bed is one quarter wavelength. However, when the acoustic velocity within the thin bed is less than the acoustic velocity of the stratum above the thin bed but greater than the acoustic velocity of the stratum below the thin bed (or vice versa) maximum enhancement of the reflected seismic energy will occur when the distance between the upper and lower interfaces of the thin bed is equal to one half wavelength.

In practicing the present invention, seismic data traces are windowed, and these data windows are converted to the frequency domain. In one embodiment of the invention a discrete Fourier Transform is utilized for conversion of the seismic data to the frequency domain. In another embodiment, a transform having poles on the unit z-circle is utilized for conversion of the seismic data to the frequency domain. However, other transforms may be utilized for converting seismic data traces to the frequency domain. The frequency domain data are then analyzed for the presence of thin beds.

Calculation of a frequency domain transform of a time series results in a collection of transform coefficients that are complex data values of the form "A+Bi", where "i" represents the "imaginary" number or the square root of a negative one. Further, it is well known that the expression A+Bi may be equivalently written as:

$$A+Bi = re^{i\Theta} \quad \text{(Eq. 3)}$$

where, $$r = |A+Bi| = \sqrt{A^2+B^2}$$

and $$\Theta = \tan^{-1}\left(\frac{B}{A}\right)$$

The quantity $\Theta$ is known as the phase angle (or just the "phase") of the complex quantity A+Bi, the quantity "r" its magnitude, and the expression |A+Bi| is the mathematical notation for the magnitude of a complex valued quantity, also called the absolute value. A frequency spectrum is obtained from the transform coefficients by calculating the complex magnitude of each transform coefficient. The numerical size of each coefficient in the frequency spectrum is proportional to the strength of that frequency in the original data.

In accordance with the present invention a plurality of frequency spectra are combined, prior to generating a data display with these frequency spectra. The traces may be combined in various patterns. For example, the frequency spectrum from traces extending along a straight line, as depicted in FIG. 3A, may be combined, or a central trace may be combined with the frequency spectra of the four closest traces, as depicted in FIG. 3B; or a central trace may be combined with the eight closest traces, as depicted in FIG. 3C; or the frequency spectra of three traces positioned in the pattern of a right triangle, as depicted in FIG. 3D, may be combined. Patterns may also be selected to accentuate certain features of the subsurface such as a suspected fault.

The traces may also be weighted in various ways. For example, a center trace may be given a weight of 1.0 and the surrounding traces given a weight of 0.25. It will also be appreciated that the trace combinations may be formed in various ways. For example, the median value of the traces may be utilized, or the average (mean) value or other combinations.

Figure 4A:
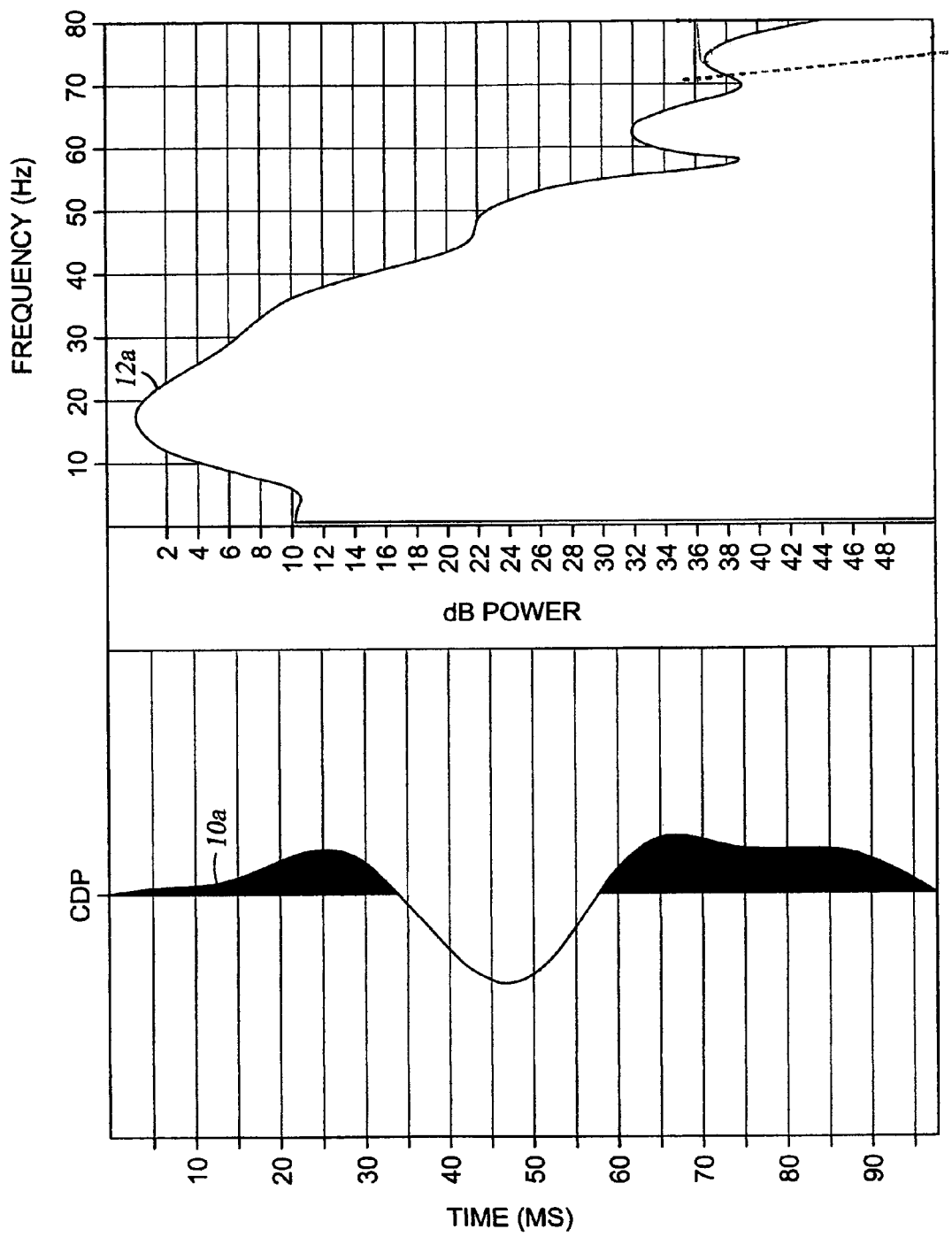
FIGS. 4A, 4B and 4C show representations of seismic traces in the time domain and the frequency domain.
Figure 4B:
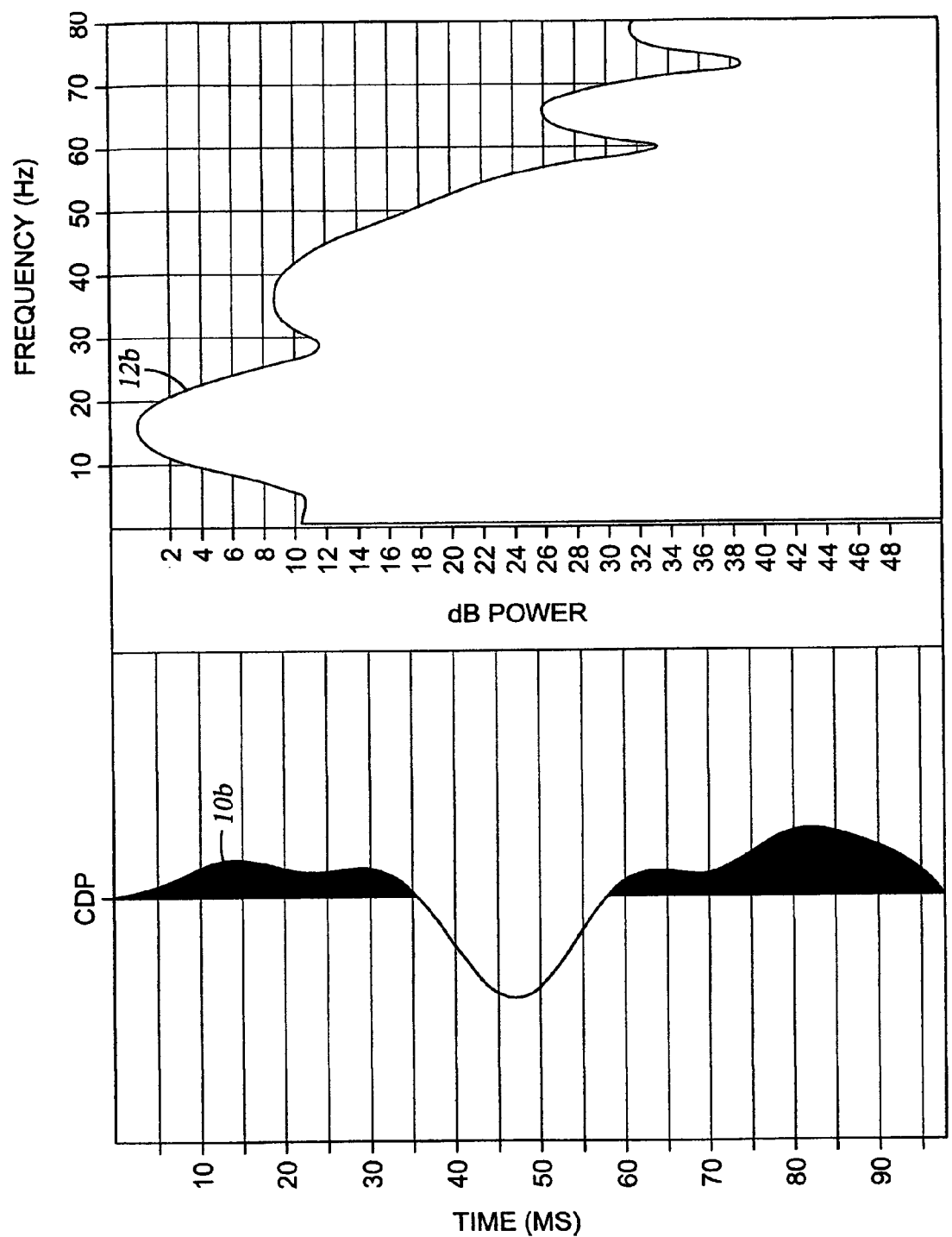
Figure 4C:
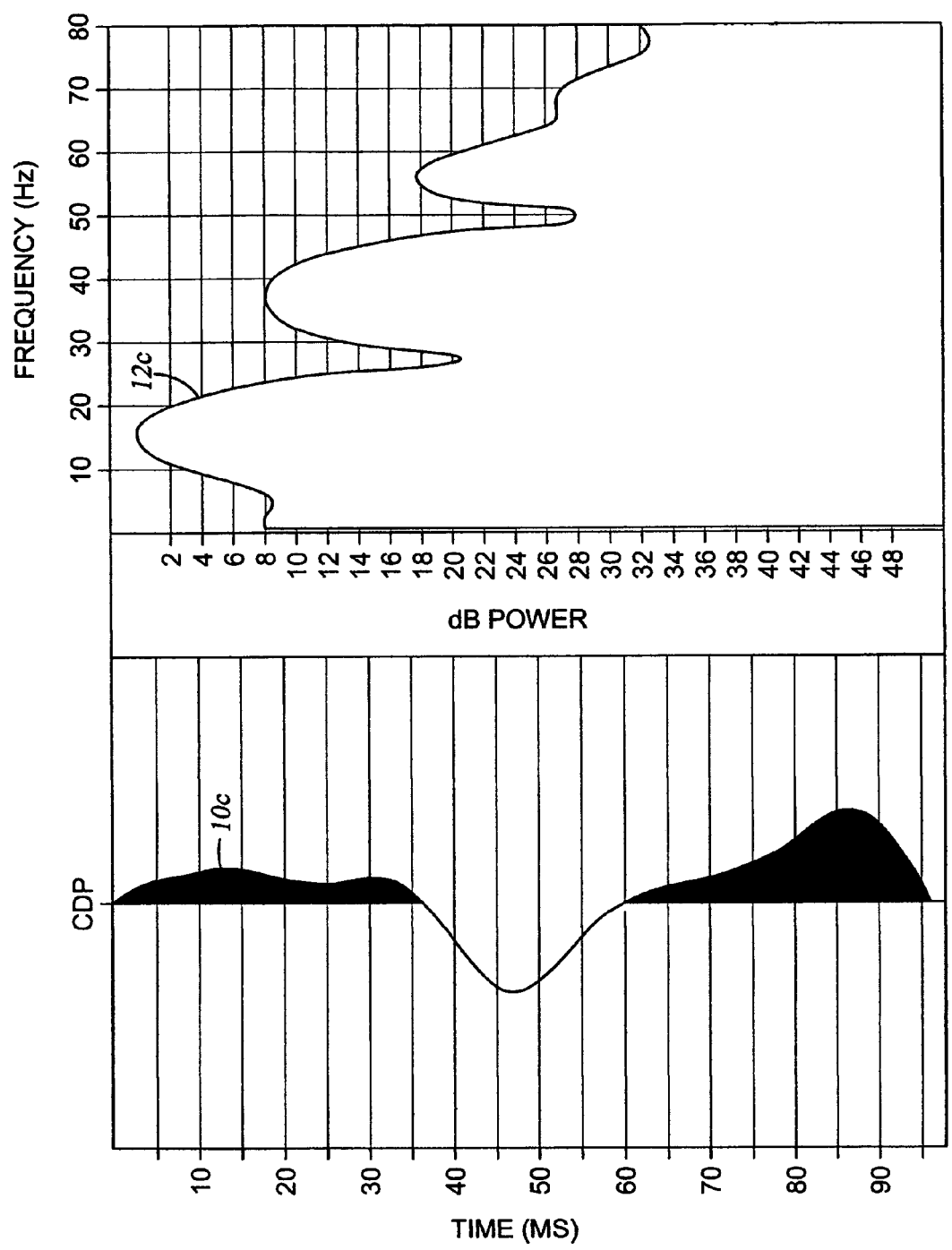
Figure 4D:
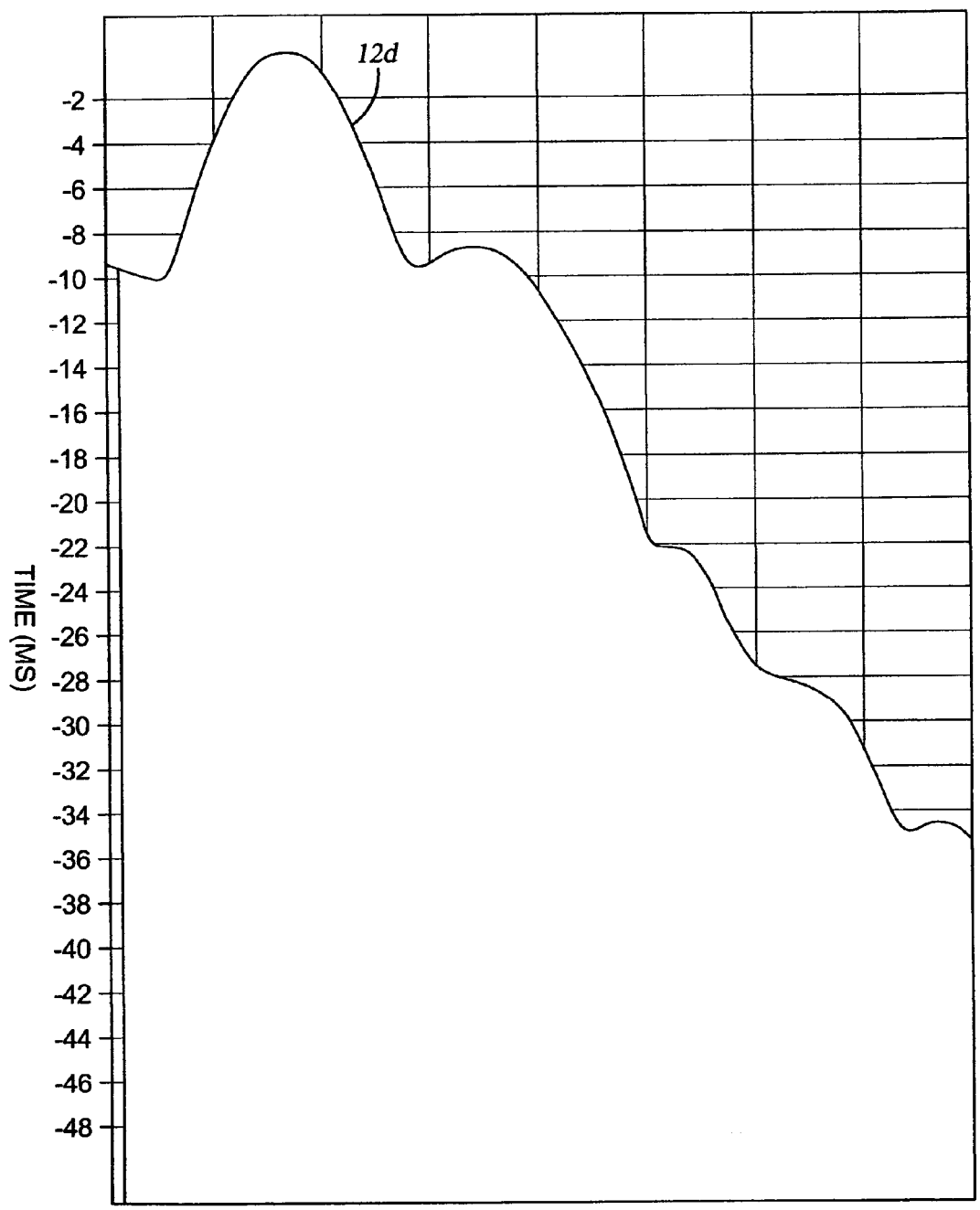
FIG. 4D shows an average of the frequency domain representations of FIGS. 4A, 4B and 4C.

FIGS. 4A, 4B and 4C each show a windowed segment of three seismic traces from adjacent locations. Each trace is shown in the time domain and in the frequency domain. The time domain traces in FIGS. 4A, 4B and 4C are designated by reference designations 10a, 10b and 10c, respectively, and the frequency domain representations of these traces are designated by reference designations 12a, 12b and 12c, respectively. The frequency domain representation shown in FIG. 4D and denoted by reference designation 12d represents an average (mean) of the frequency representations designated by reference designations 12a, 12b and 12c.

U.S. Pat. No. 5,870,691, which is incorporated herein by reference, discloses a process in which a discrete Fourier Transform, or a similar discrete linear unitary transformation, is utilized to image and map the extent of thin beds and other lateral rock discontinuities in conventional 2-D and 3-D seismic data. This process utilizes the observation that a thin bed introduces a periodic sequence of notches into the amplitude spectrum of a frequency domain transform of a seismic trace, which are spaced a distance apart that is inversely proportional to the temporal thickness of the thin bed. Accordingly, the thickness of the thin beds is determined by distance by which these notches are spaced apart. By applying the present invention to the process described in U.S. Pat. No. 5,870,691, and averaging the amplitude spectra of the frequency domain transform of a plurality of spatially related traces, the signal to noise ratio is substantially improved and, accordingly, the quality of the processed data is improved. The "average" may be the mean, the median, or other weighted average. In this embodiment of the invention the transform coefficients generated when the seismic data are transformed to the frequency domain may be multiplied by a scaling value to form a scaled tuning cube, where the scaling value is determined by selecting at least two transform coefficients corresponding to a same basis function, calculating a complex magnitude of all transform coefficients so selected, calculating an average value from all transform coefficient magnitudes so calculated and calculating a scaling value from the average value. The scaled tuning cube is then displayed.

In another embodiment of the invention, seismic data traces are windowed, these data windows are converted to the frequency domain, and the component of the resulting frequency spectrum having the greatest amplitude is estimated. Knowledge of this frequency, along with knowledge of the sonic velocity profile of the subsurface can be utilized to determine the presence of, and the thickness of, thin beds in the earth's subsurface. As discussed previously, the seismic signal recorded at the surface may be viewed as the mathematical convolution of the downgoing source wavelet with a reflectivity function that represents the reflection coefficients at the interfaces between different rock layers in the subsurface. If a long window is used, a lot of geology is averaged together, and for the purposes of performing the first embodiment of the present invention, the window should preferably be short to minimize geologic averaging.

In a preferred embodiment of the invention, an estimate of the frequency spectrum of the seismic data is generated by use of a transform having poles on the unit z-circle. Use of such a transform permits a shorter window to be utilized. In a preferred implementation the maximum entropy transform is utilized. The estimate of the frequency spectrum away from the peak frequency may be poor when a short time window is used, but in this embodiment of the invention, the objective is to identify just one amplitude peak in the frequency spectrum, rather than to precisely estimate the entire spectrum.

The maximum entropy method (MEM) equation for developing an approximation of the power spectrum, P(f), is as follows:

$$P(f) \approx \frac{a_0}{\left|1 + \sum_{k=1}^{M} a_k z^k\right|^2} \quad \text{(Eq. 4)}$$

where:

$a_0$ and $a_k$ are the coefficients

M is the total number of samples in the data window k is the index for the summation, and z represents the Z transform.

Processes for computing the coefficients $a_0$ and $a_k$ are known to those of ordinary skill in the art. For example, one subroutine for computing these coefficients, listed in Numerical Recipes in C, Second Edition, by William H. Press et al., Cambridge University Press, Cambridge, England, 1992, on pages 568–569, is referred to therein as MEMCOF, and is incorporated herein by reference. However, other subroutines known to those of ordinary skill in the art may be used for this purpose. In the maximum entropy method, the coefficients which are determined in order to approximate the frequency spectrum are all in the denominator of the equation. Accordingly, the equation has poles, corresponding to infinite power spectral density, on the unit z-circle, i.e., at real frequencies in the Nyquist interval. Such poles can provide an accurate representation for underlying power spectra that have short, discrete "lines" or delta-functions.

In a preferred embodiment of the invention the peak frequency (i.e., the frequency in the frequency spectrum having the greatest power amplitude) is determined for each window of the averaged seismic data traces. In one embodiment of the invention, the kurtosis, the fourth moment of the spectrum, is then evaluated to determine how peaked the frequency distribution is for each data window. In one embodiment of the invention, only the data from those data windows for which the kurtosis exceeds a selected kurtosis value are utilized as output data.

In a particular implementation of the invention, either of three forms of output data may be selected. The first option (option one) is the amplitude of the spectrum at the peak frequency. The second option (option two) is the frequency at which the amplitude peak occurs, for example, 30 Hz. The third option (option three), provided a selected peakedness (i.e., kurtosis) threshold in the frequency spectrum is exceeded, is an estimate of the thickness of the thin bed.

The invention will normally be implemented in a digital computer. Computer instructions readable by a digital computer and defining the process of this invention will normally be stored on magnetic tape, a magnetic disk such as a CD-ROM, an optical disk, or an equivalent storage device and will instruct the computer to perform such process. A flow diagram for a program useful in implementing an embodiment of the invention is outlined in FIG. 5A. In a particular embodiment of the invention the following operational parameters may be used:

1. the output data option
2. the number of poles in the spectral estimate
3. the half-width (in milliseconds) of the spectral-estimation window
4. the minimum frequency of input data
5. the maximum frequency of the input data
6. The traces to be combined and any weighting to be applied to the traces
7. the frequency at which to begin the search for the peak frequency
8. velocity to use for the thickness estimation (in meters/second)
9. cutoff kurtosis for thickness estimation.

The first relevant issue in specifying the number of poles to be used in the spectral estimate and the half width of the spectral-estimation window is that the spectral resolution in Hz. will be approximately the reciprocal of the window length in seconds, so that as the window length is increased, spectral resolution is improved. The second point is that if the number of poles is close to the number of seismic data samples in the window then spurious peaks will be exhibited, and the quality of the image will be decreased. The third point is that the number of poles should be limited to a few times the number of sharp spectral features that are to be fit. Since only one spectral feature (one peak frequency) is desired, the number of poles may preferably be limited to 1, 2, 3 or 4 poles, however, useful results may be obtained with more than 4 poles. Accordingly, the number of data samples which are required will be controlled by the number of poles utilized, and the number of data samples required will determine the window length required.

The input data set could theoretically have data from zero frequency up to the Nyquist frequency (a typical Nyquist frequency is around 250 Hz.). However, most seismic data sets do not have significant very low frequency energy, that is, energy at less than 5 or 10 Hz., and most seismic data sets do not have significant energy above 60 Hz. Therefore, the calculations can be speeded up by limiting the calculations to between a specified minimum frequency cut-off, such as 5 or 10 Hz., and a maximum frequency cut-off, such as 60 Hz. If the user has advance knowledge of the likely value of the peak frequency, the calculation process can be speeded up by specifying the frequency at which to begin the search for the peak frequency.

The velocity to be used for the thickness estimation is usually known from well logs from the area from which the data were recorded. If such well logs are not available, velocity values determined from other subsurface regions having similar lithologies may be utilized. Test results suggest that a normalized kurtosis value of 0.5 is appropriate. However, based on user experience, different values for the kurtosis cutoff may be appropriate for different data sets.

Figure 5A:
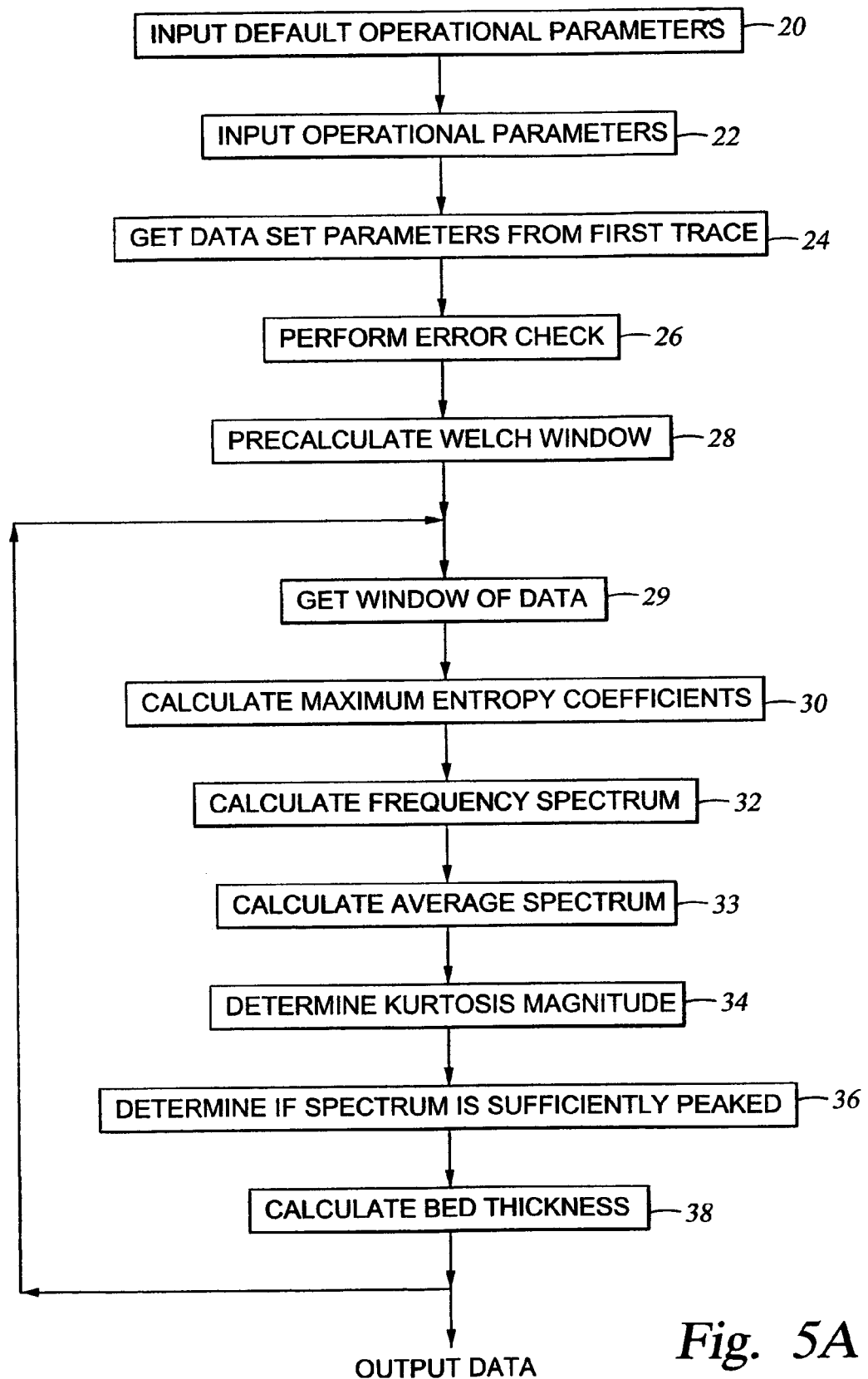
FIG. 5A shows a flow diagram for a program useful in implementing an embodiment of the invention.

Default operational parameters may be set up for the output data option, the number of poles in the spectral estimate, the half-width (in milliseconds) of the spectral-estimation window, the minimum frequency of input data, the maximum frequency of the input data, the number of traces to be averaged and any trace weighting, the velocity to use for the thickness estimation (in meters/second), and the cutoff kurtosis for thickness estimation. With reference to FIG. 5A these default values are inputted in step 20.

In step 22 operational parameters for the specific set of seismic data being processed are inputted, which may include the parameters listed as parameters 1–9, above.

In step 24, the program obtains the data set parameters from the first seismic trace. These parameters may include the length of the trace, the sample time interval, the in-line and cross-line dimensions of the data set, the shot number, the length of vibrator sweep, static correction data, the date and time of day and the field identification.

In a particular implementation of the invention error checking is performed in step 26 to determine that the input values from step 24 are reasonable. For example, the sample interval, which is the amount of time between samples in the seismic trace, obviously cannot be zero or less than zero.

Figure 6:
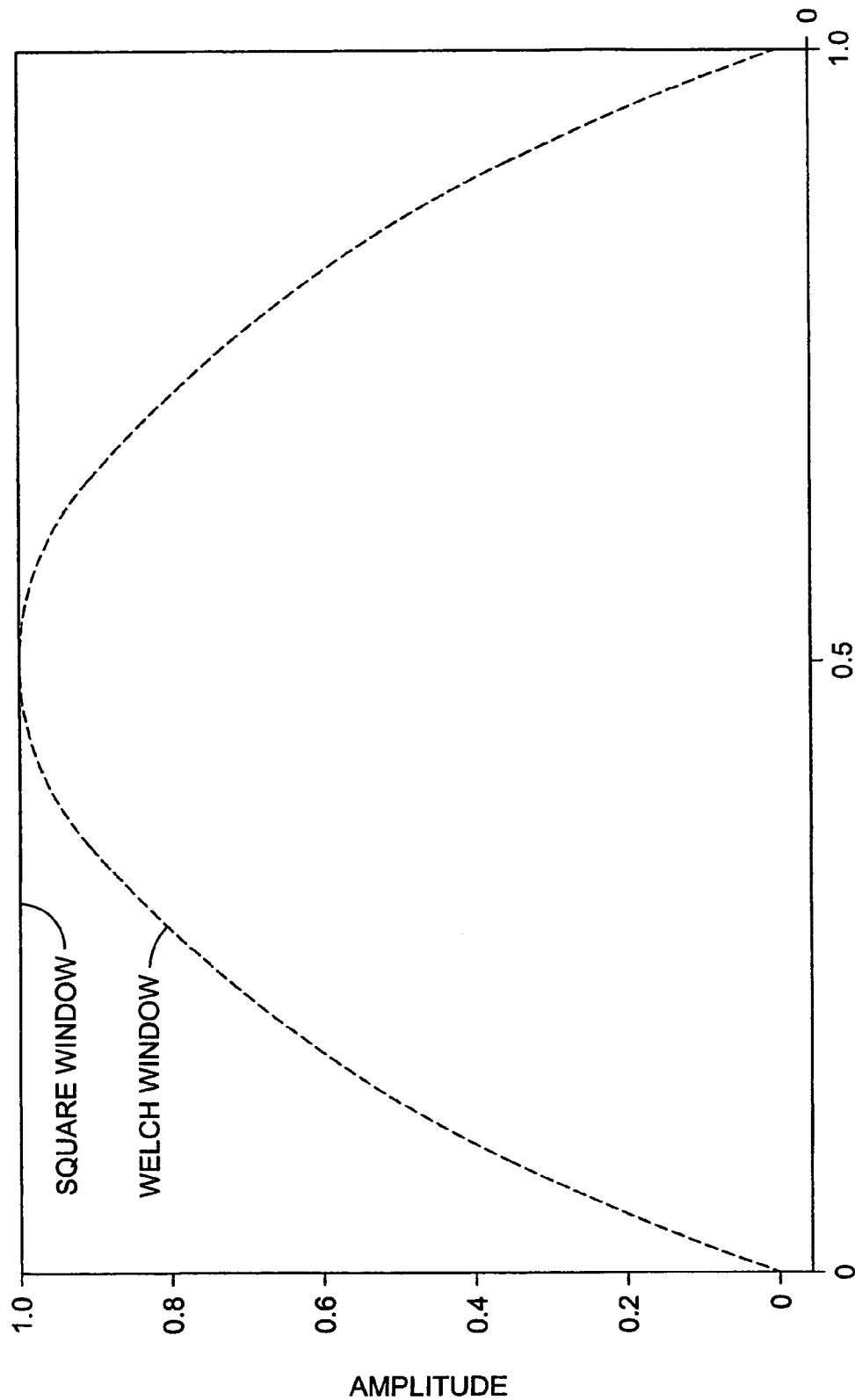
FIG. 6 shows the form of the Welch window.

The next step, step 28, is to precalculate a Welch window, which is applied to the window of seismic data before making the spectral estimate. Those of ordinary skill in the art will recognize from standard filter theory that the data in the selected window will need to be tapered, and precalculating a Welch window avoids the need to calculate the taper each time a trace is looped over. The form of the Welch window, which is well known to those of ordinary skill in the art is illustrated in FIG. 6. Those of ordinary skill in the art will recognize that other patterns for tapering the data, other than the Welch window pattern, may be utilized.

In step 29, the program initially obtains the first selected window of data from the first selected seismic trace. In a preferred embodiment, the program uses a first do loop to loop over the traces in the seismic data set and a second do loop to loop over successive data windows within each trace. Each time the program obtains the data from a selected window, it obtains the data samples within a time span of one-half the window length on each side of a selected center point. If the selected center point is from the beginning of the trace or the end of the trace, there may not be sufficient time span on either the upper or lower side of the center point for a full half-window, and if data for the full window is not available, then no spectral estimation is made. If there is enough time span on each side of the selected center point, the spectral estimate is performed. The window of data is copied into a work buffer, and it is verified that the data are not all zeros.

In step 30, the first step of the maximum entropy routine is then performed, which is the calculation of the maximum-entropy coefficients. The routine utilized for computing the coefficients is sent to the work buffer into which the window of data samples has been copied, along with the length of the window (WIN) and the number of poles (N) to use in the maximum entropy spectral estimate. The coefficients for the maximum entropy spectral estimate are then returned from this calculation.

After the coefficients are calculated, the coefficients are used in step 32 to calculate the frequency spectrum by processes which are well known to those of ordinary skill in the art. One routine for performing this computation is the EVLEM routine shown on page 575 of *Numerical Recipes in C*, Second Edition, by William H. Press et al., Cambridge University Press, Cambridge, England, 1992, which page is incorporated herein by reference.

In step 33, an average is then taken of the amplitude of the frequency spectra of a selected number of spatially associated traces to generate an "averaged" trace. The spectrum of this averaged trace is then evaluated to find the peak frequency in the spectrum of the averaged trace and the amplitude of the peak frequency.

Once the peak frequency is determined, the program outputs either of three data items for the output depending on which option is selected. Option one is the amplitude of the spectrum at the peak frequency. Option two is to provide the peak frequency as an output. Option three is an estimate of the thickness of the thin bed.

If output option 3 has been selected, the kurtosis of the spectrum is calculated in step 34, and a determination is made in step 36 as to whether the kurtosis exceeds a preselected kurtosis value, and accordingly, indicates the presence of a thin bed.

If the spectrum is sufficiently peaked, and if the third output option is chosen, which is the option where the bed thickness is computed, then the thickness estimate is calculated in step 38 using the standard formula, known to those of ordinary skill in the art, for estimating a thickness at the tuning frequency. This formula is simply ¼ times the velocity divided by the frequency of the peak frequency (the tuning frequency).

The program will then loop over each successive window in the first selected seismic data trace and steps 29, 30, 32, 33, 34, 36 and 38 of FIG. 5A are applied to the data samples within each selected window. After the second do loop has looped over each window of the first selected data trace, the first do loop will then loop over successive traces, and the second do loop will loop over each window in each successive traces in the same manner as for the first selected trace.

The flow diagram of FIG. 5A, and the foregoing discussion with reference to FIG. 5A, illustrate a particular embodiment of the invention in which kurtosis of the frequency spectra calculated in step 32 is determined, and the thickness of thin beds is calculated from the calculated frequency spectra which are sufficiently peaked.

Figure 5B:
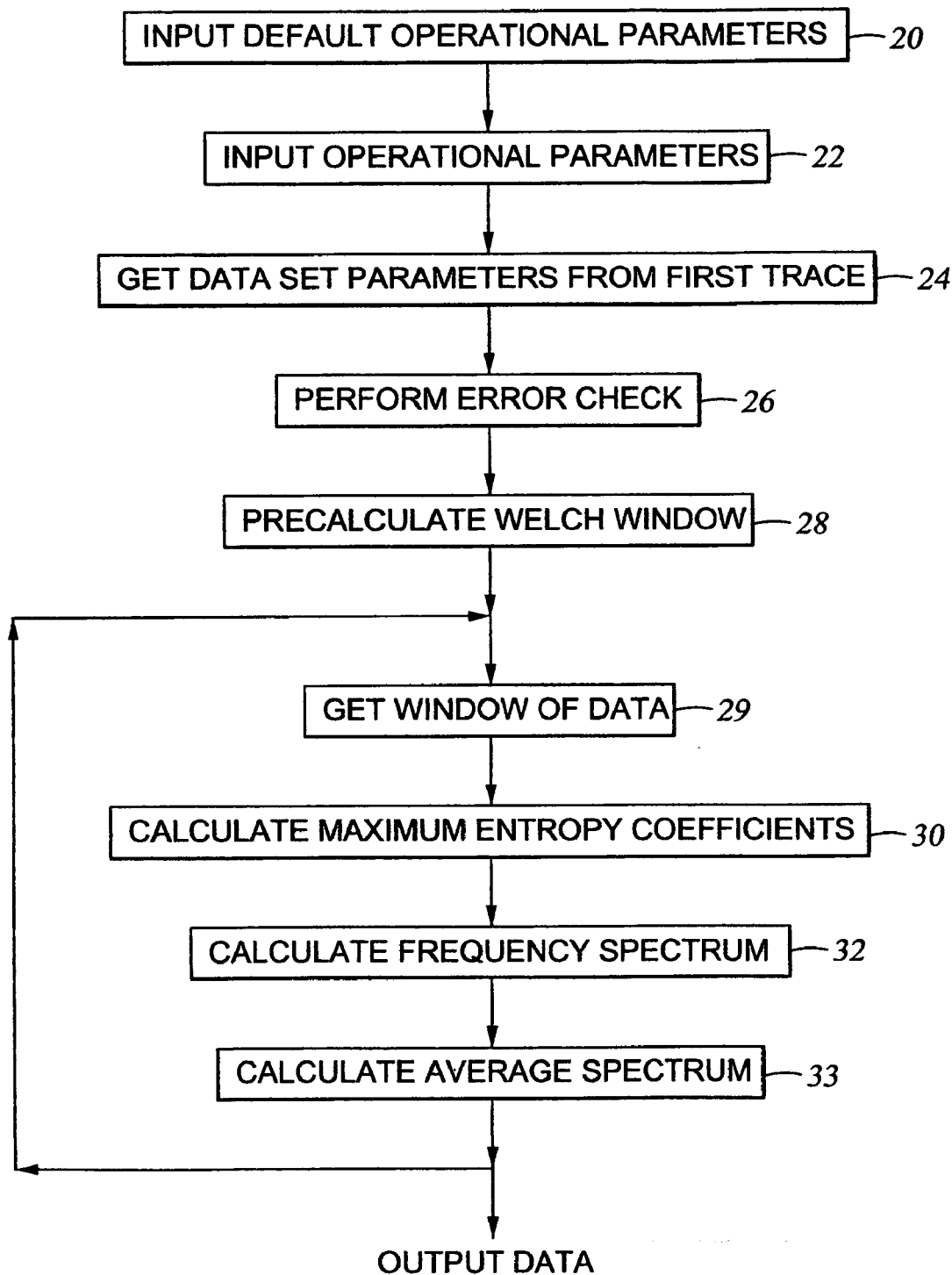
FIG. 5B shows another flow diagram for a program useful in implementing an embodiment of the invention.

It is also contemplated that the frequency spectra calculated in step 32 may be utilized to provide data regarding the presence of thin beds without performing steps 34, 36 and 38. The flow diagram of FIG. 5B illustrates this embodiment of the invention in which the output data may be in the form of either option 1 (the amplitude of the spectral peak) or option 2 (the frequency at which the amplitude peak occurs).

Output data, whether in the form of option 1, option 2 or option 3 are applied to a commercially available visualization software package to generate displays which may be viewed by an explorationist.

Figure 8A:
FIGS. 8A and 8B further illustrate the results of use of the invention.
Figure 8B:

Improved results obtained from use of the invention are illustrated in FIGS. 7A and 7B, and in FIGS. 8A and 8B. FIGS. 7A and 8A represents data processed without use of spatial averaging according to the present invention. FIGS. 7B and 8B show the same data but with use of spatial averaging according to the invention. The white space in the figures represents higher amplitude signals related to tuning thickness. In FIGS. 7A and 7B the white space represents the locations and the frequencies at which tuning occurred. The improvement provided by the invention is illustrated in FIG. 7B by the absence of the artifact which is present in FIG. 7A. This artifact is indicated by arrow 40 pointing to the artifact in FIG. 7A and pointing to the location where the artifact was removed in FIG. 7B. FIGS. 8A and 8B are map (top) views, in which the white space represents locations where tuning is occurring. The improvement is evident because two layers of white space are shown more distinctly in FIG. 8B at the levels indicated by reference numerals 42 and 44 than in FIG. 8A.

While the invention has been described with reference to certain preferred embodiments, it is understood that the invention is applicable to any method for delineating a thin bed in which a seismic data trace is converted to the frequency domain, and features of the frequency domain traces are utilized to estimate the existence of or properties of the thin beds. Further, while the invention has been described and illustrated herein by reference to certain preferred embodiments in relation to the drawings attached hereto, various changes and further modifications, apart from those shown or suggested herein, may be made herein by those skilled in the art, without departing from the spirit of the invention, the scope of which is defined by the following claims.

I claim:

1. A method of processing a group of spatially related seismic data traces, comprising:
   defining seismic data windows extending over selected portions of said group of spatially related seismic data traces;
   applying a transform to said seismic data traces within said defined windows to convert said seismic data traces within said defined windows to the frequency domain thereby generating a frequency spectrum of the each seismic data trace within said defined windows;
   combining in selected patterns the frequency spectra of selected traces from adjacent locations within said windows to generate a plurality of averaged frequency spectra of said traces from adjacent locations; and
   analyzing said averaged frequency spectra to determine the location of thin beds in the earth's subsurface.

2. The method of claim 1 wherein said transform is a transform having poles on the unit z-circle, where z is the z-transform.

3. The method of claim 2 wherein said transform is the maximum entropy transform.

4. The method of claim 3 wherein said transform has from one to four poles on the unit z-circle.

5. The method of claim 1 wherein said transform is a discrete linear unitary transform.

6. The method of claim 5 wherein said transform is a Fourier transform.

7. The method of claim 1 wherein said average is the median.

8. The method of claim 1 wherein said average is the mean.

9. The method of claim 1 wherein said average is a weighted average.

10. The method of claim 1 further comprising determining the frequency value of the frequency component having the greatest amplitude with each said averaged frequency spectrum; and
    wherein said frequency values are utilized to determine the location of thin beds in the earth's subsurface.

11. The method of claim 10 wherein said data comprises a three-dimensional volume of seismic data.

12. The method of claim 11 further comprising generating a substantially horizontal cross-section of said seismic data to depict the location of thin beds.

13. The method of claim 1 further comprising determining the greatest amplitude of the frequency components within each said averaged frequency spectrum; and
    wherein said amplitudes are utilized to determine the location of thin beds in the earth's subsurface.

14. The method of claim 13 wherein said data comprises a three-dimensional volume of seismic data.

15. The method of claim 14 further comprising generating a substantially horizontal cross-section of said Seismic data to depict the location of thin beds.

16. The method of claim 1 further comprising:
    determining for each generated averaged frequency spectrum whether the peakedness of said generated averaged frequency spectrum exceeds a selected value of peakedness; and
    for each generated averaged frequency spectrum for which the peakedness exceeds said selected value of peakedness, utilizing the averaged frequency spectrum to determine the location of thin beds in the earth's subsurface.

17. The method of claim 16 wherein said peakedness is kurtosis.

18. The method of claim 1 further comprising:
    determining the frequency component having the greatest amplitude within each said averaged frequency spectrum;
    calculating the kurtosis of each said averaged frequency spectrum determining if the kurtosis of each said averaged frequency spectrum exceeds a selected value of kurtosis; and
    utilizing said frequency components having the greatest amplitude within said averaged frequency spectra having a kurtosis value which exceeds said selected value of kurtosis to determine the location of thin beds in the earth's subsurface.

19. The method of claim 18 wherein said data comprises a three-dimensional volume of seismic data.

20. The method of claim 19 further comprising generating a substantially vertical cross-section of said seismic data to depict the location of thin beds.

21. The method of claim 1 wherein combining the frequency spectra of traces in selected patterns comprises combining the frequency spectra of traces extending along a straight line.

22. The method of claim 1 wherein combining the frequency spectra of traces in selected patterns comprises combing the frequency spectrum of a central trace with the frequency spectra of the four traces closest to the central trace.

23. The method of claim 1 wherein combining the frequency spectra of traces in selected patterns comprises combining the frequency spectra of traces positioned in the pattern of a right triangle.

24. A device adapted for use by a digital computer wherein a plurality of computer instructions readable by said digital computer are encoded said instructions defining a process comprising defining seismic data windows extending over selected portions of a group of spatially related seismic data traces, applying a transform to said seismic data traces within said defined window to convert said seismic data traces within said defined windows to the frequency domain thereby generating a frequency spectrum of each seismic data trace within said defined windows, combining in selected patterns the frequency spectra of selected traces from adjacent locations within said windows to generate a plurality of averaged frequency spectra of said traces from adjacent locations, analyzing said averaged frequency spectra to determine the location of thin beds in the earth's subsurface, and instructing said computer to perform said process.

25. The device of claim 24, wherein said device is selected from the group consisting of a magnetic tape, a magnetic disk, and an optical disk.

26. A digital computer programmed to process a group of spatially related seismic data traces, said process comprising the steps of:
    defining seismic data windows extending over selected portions of said group of spatially related seismic data traces;
    applying a transform to said seismic data traces within said defined windows to convert said seismic data traces within said defined windows to the frequency domain thereby generating a frequency spectrum of each seismic data trace within said defined windows;
    combining in selected patterns the frequency spectra of traces from adjacent locations within said windows to generate a plurality of averaged frequency spectra of said traces from adjacent locations; and
    analyzing said averaged frequency spectra to determine the location of thin beds in the earth's subsurface.

* * * * *